United States Patent [19]

Machida et al.

[11] 4,441,006
[45] Apr. 3, 1984

[54] PROCESS OF JOINING A CONTACT

[75] Inventors: Kazumichi Machida; Yoshie Inada, both of Hyogo, Japan

[73] Assignee: Mitsubishi Denki Kabushiki Kaisha, Tokyo, Japan

[21] Appl. No.: 403,628

[22] PCT Filed: Jan. 14, 1982

[86] PCT No.: PCT/JP82/00013
§ 371 Date: Jul. 19, 1982
§ 102(e) Date: Jul. 19, 1982

[87] PCT Pub. No.: WO82/02621
PCT Pub. Date: Aug. 5, 1982

[51] Int. Cl.³ ............................................. B23K 1/00
[52] U.S. Cl. .............................. 219/85 CM; 219/110; 219/117.1
[58] Field of Search ............... 219/109, 110, 117.1, 219/85 CA, 85 CM

[56] References Cited

U.S. PATENT DOCUMENTS 3,400,242  9/1968  Waller .................................. 219/110
3,404,252 10/1968  Michael ............................... 219/110
3,569,659  3/1971  Benton et al. ....................... 219/110
3,585,347  6/1971  Needham et al. ................... 219/110

OTHER PUBLICATIONS

Expansion Monitoring of Distance Between Electrode in a Spot Welding-"Electrode Separation Applied to Quality Control in Resistance Welding" by D. N. Waller et al., Apr. 1965, 168-s.

Primary Examiner—C. C. Shaw
Attorney, Agent, or Firm—Oblon, Fisher, Spivak, McClelland & Maier

[57] ABSTRACT

The gap between upper and lower electrodes 1, 2 is measured at constant intervals of time while a contact 5 and a base 6 are pressed by the upper and lower electrodes under a constant pressure. Supply of an electric current to the upper and lower electrodes is controlled upon elapse of a predetermined interval of time after the gap has reached a maximum 18. The amount of metal melted out of a joining interface between the contact 5 and the base 6 is thus quantized to improve and stabilize the quality of joining between the contact 5 and the base 6.

4 Claims, 10 Drawing Figures

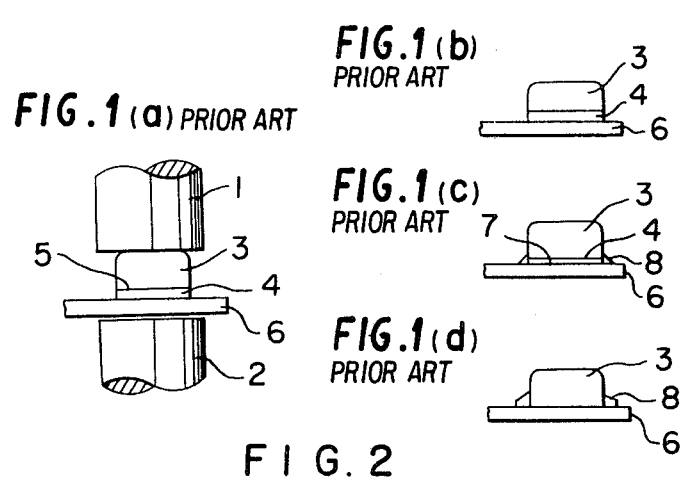
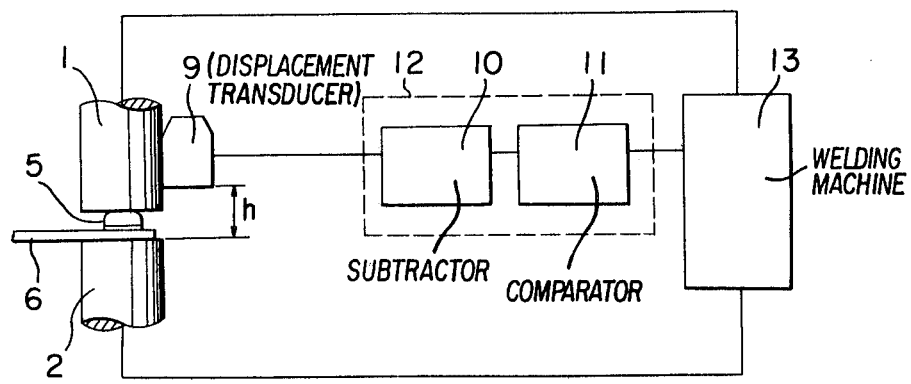
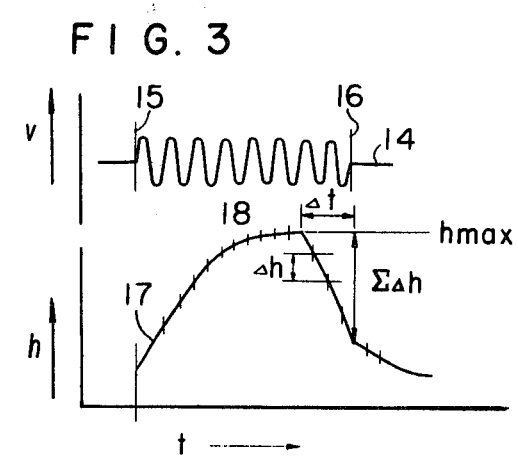

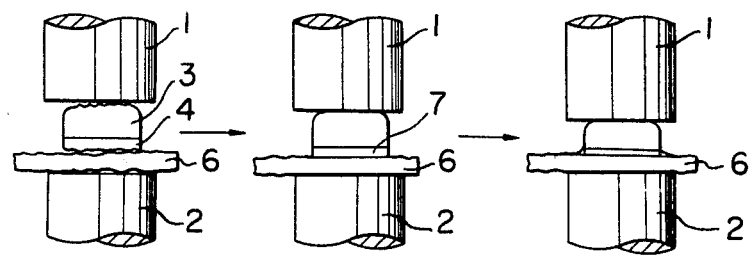
FIG.4(a)    FIG.4(b)    FIG.4(c)
FIG. 5
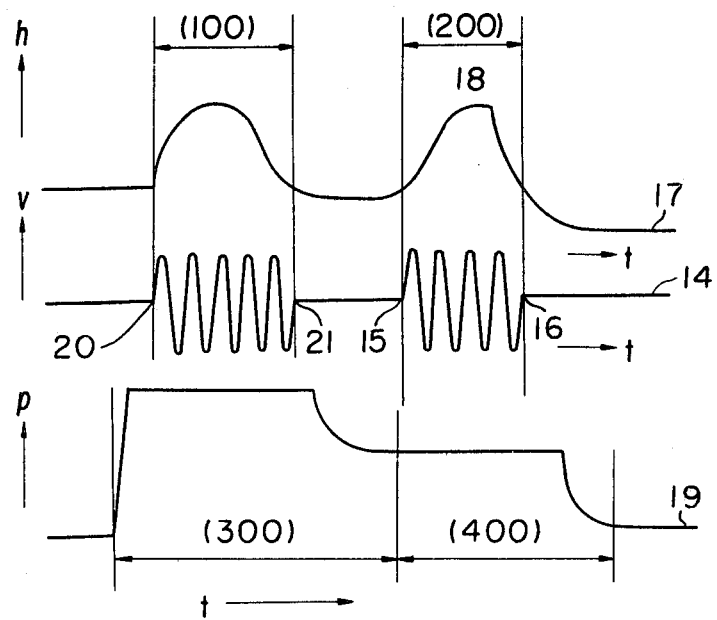

PROCESS OF JOINING A CONTACT

FIELD OF TECHNOLOGY

The present invention relates to a process of joining a contact for electric equipment to a base by resistance welding, brazing, fusion welding, or the like, typically by spot welding, the process comprising the step of monitoring the displacements of upper and lower electrodes sandwiching the contact and the base therebetween to control energization of the electrodes.

BACKGROUND OF TECHNOLOGY

There has been practiced a conventional process of joining a contact for electric equipment such for example as an electromagnetic contactor (hereinafter referred to simply as a "contact") to a base. According to such a known process, a contact material is clad with a layer of silver, which is joined to a base as by spot welding.

Such a contact joining process utilizing heat caused by an electrical resistance is far more efficient in joining operation than other joining processes that use brazing, fusion welding, pressure welding, and the like. However, the prior joining process has resulted in unstable joined surfaces due to insufficient joining or an excessive amount of melted silver.

FIGS. 1(a) through 1(d) are schematic views illustrative of a joining process which relies on spot welding. Designated in these figures at 1 is an upper electrode, 2 a lower electrode disposed in confronting relation to the upper electrode 1, 3 a contact material, 4 a layer of silver with which the contact material 3 is clad, 5 a contact that is composed of the joined contact material 3 and silver layer 4, 6 a base, 7 a joining interface, and 8 a mass of melted metal.

According to the spot welding, the contact 5 and the base 6 which are to be joined together are sandwiched between the electrodes 1, 2 as shown in FIG. 1(a), and are pressed and supplied with an electric current which flows therethrough. Part of the layer of silver is melted by the heat caused by an electrical resistance in a current path constituted by the contact material 3 and the silver layer 4. The melted silver partly flows from the joining interface to form a mass 8 of melted metal which joins the contact 5 and the base 6. The condition in which a proper amount of silver 4 that is attributable to stable joining is in quite a small range for the reasons described below.

The layer 4 of silver is employed to enable the contact material 3 and the base 6 to improve their joining, which would otherwise be quite poor. The silver layer 4 has a thickness which is normally about 10% of that of the contact 5. Silver layers which are available on the market in quantities are approximately 100 μm thick. The joining area 7 is acceptable as shown in FIG. 1(c) when an optimum amount of such a silver layer 4 is melted from the joining interface.

If the amount of melted silver were too small, then the assembly would be joined as shown in FIG. 1(b). On the other hand, if the amount of melted silver were too large, then the contact assembly would be as shown in FIG. 1(d). In either case, the joined area would become poor. A good joined area such as shown in FIG. 1(c) might be achieved by making a strict selection of a pressure, a welding current, and an interval of time during which the current flows between the electrodes, welding conditions which are needed to melt a proper amount of silver in a thin layer 4 that is about 100 μm thick. However, such welding conditions could vary with a primary voltage, a primary pressure, and wear of the electrodes, and it would be quite difficult to allow a proper amount of silver to be melted from its layer.

There has also been known a spot brazing process in which spot welding accompanies brazing filler metal and flux to enlarge and strengthen the area joined by the brazing filler metal. While the spot brazing process renders the joining interface somewhat better, it still falls short of accomplishing a fully stable and improved joining interface, and is also disadvantageous in that it requires additional materials such as brazing filler metal and flux.

Although the foregoing description has been directed to resistance welding as represented by spot welding, it has been as difficult to form a stable and improved joining interface with other joining processes.

SUMMARY OF THE INVENTION

The present inventon provides a process of joining a contact to a base by sandwiching the contact and the base between upper and lower electrodes under a certain pressure and by allowing an electric current to flow between the electrodes to thereby join the contact and the base together. The process comprises the steps of detecting the displacements (gap h) of the electrodes, and controlling the interval of time during which the electric current flows between the electrodes on the basis of the displacements, so that the contact and the base can be joined to each other through a joined area which is highly reliable and stable without impairing a desired joining efficiency which is an advantage of the spot welding process.

The interval of time during which the electric current flows between the electrodes can be controlled by cutting off the electric current when a predetermined time has elapsed after the displacements have reached their maximum or when a deviation from such a maximum reaches a certain degree. With such an arrangement, the amount of melted metal at the joined area can be quantized for achieving a good and uniform joining interface.

Furthermore, the present invention provides a contact joining process in which the displacements of (gap between) the electrodes are detected to control the electric current flowing through the electrodes on the basis of such displacements, so that an optimum electric current which flows through the electrodes can be ensured while a quick response to variations in the electric current.

BRIEF DESCRIPTION OF THE DRAWINGS

FIGS. 1(a) through 1(d) are schematic views illustrative of a conventional spot welding process and parts joined thereby;

FIG. 2 is a schematic view showing a first embodiment according to the present invention;

FIG. 3 is a waveform diagram illustrative of an operation according to the first embodiment of the present invention;

FIGS. 4(a) through (c) are schematic views illustrating a second embodiment according to the present invention; and FIG. 5 is a waveform diagram showing an operation according to the second embodiment of the present invention.

PREFERRED EMBODIMENTS OF THE INVENTION

The embodiments of the present invention will now be described with reference to the drawings. Designated in FIG. 2 at 1 is an upper electrode, 2 a lower electrode, 5 a contact clad with a layer of silver, and 6 a base, the contact 5 and the base 6 being sandwiched between the electrodes 1, 2. The displacement transducer 9 which is a major component of the present invention comprises, for example, an eddy-current type displacement transducer. According to the illustrated embodiment, the displacement transducer 9 is fixed to a side of the upper electrode 1 for detecting displacements of (or a gap between) the electrodes 1, 2 through an output wire. A circuit 10 for effecting an arithmetic operation is composed for example of a subtracter. The circuit 10 may comprise an integrated circuit SN7483 manufactured by Texas Instruments. A comparator and decision circuit 11 if connected to the circuit 10. The comparator and decision circuit 11 may comprise an integrated circuit SN7485 manufactured by Texas Instruments. The arithmetic circuit 10 and the comparator and decision circuit 11 jointly constitute a control unit 12, which serves to deliver a control signal to a welding machine 13.

The welding machine 13 has a power supply, a timer switch, a circuit for controlling an electric current to be supplied to the electrodes, and the like.

FIG. 3 is a waveform diagram showing an operation according to the embodiment shown in FIG. 2. Designated at 14 is a voltage waveform occuring when the upper electrode 1 and the lower electrode 2 are supplied with an electric current. The electric current starts being supplied to the electrodes at a point 15 and is cut off at a point 16.

A waveform 17 is indicative of displacements of the electrodes as dependent on an output of the displacement transducer 9. A review of the waveform 17 indicates that the displacements become progressively larger, reach a maximum 18, and then become progressively smaller.

The displacement waveform and the maximum value therefor can be derived by sampling the distance between the electrodes at constant intervals of time with the displacement transducer, effecting an arithmetic operation on variations in the distance at the time intervals with the subtracter 10, and then comparing the results of arithmetic operations with a reference value 0 or a small value $+\Delta\alpha$ with the comparator and decision circuit 11.

The displacement transducer 9 may measure the distance or the length of a gap between the upper and lower electrodes at constant intervals of time. According to the illustrated embodiment, however, the displacement transducer 9 measures that distance plus the length of a portion of the electrode 1. Such a mode of measurement causes no problem as it can relatively detect a length proportional to the gap between the upper and lower electrodes 1, 2.

The welding phenomenon and the idea of controlling welding according to the invention will be described on the basis of such a displacement waveform. While the contact 5 and the base 6 are sandwiched between the upper and lower electrodes 1, 2 and pressed thereby at a certain pressure, an electric current is supplied to the upper and lower electrodes 1, 2 at the point 15 and at a voltage having the waveform 14. The electrodes are continuously energized in predetermined cycles.

Since the upper and lower electrodes 1, 2, the contact 5, and the base 6 each have a resistance, a Joule heat is generated by such a resistance as the electric current is continuously supplied. The Joule heat generated causes the upper and lower electrodes 1, 2, the contact 4, and the base 6 to be expanded respectively according to their coefficients of cubical expansion. The gap h between the upper and lower electrodes becomes progressively larger as shown by the waveform 17 in FIG. 3 because of such an expansion in volume. With the upper and lower electrodes 1, 2, the contact 5, and the base 6 being pressed under a certain pressure, the displacement waveform reaches its maximum 18 and starts falling when the silver layer 4 in the contact 5 is melted at the joining interface and starts flowing out therefrom. Thus, the gap between the upper and lower electrodes 1, 2 is reduced by the amount which corresponds to the volume of silver which has been melted away.

The timer switch in the welding machine 13 is set to a time when a predetermined interval $\Delta t$ of time has elapsed after the displacement has reached the maximum 18, that is, when an optimum amount of silver 4 is melted out of the joining interface to form a fillet. The timer switch can thus be actuated at the point 16 (that is, upon elapse of the time interval $\Delta t$) to cut off the supply of the electric current to the upper and lower electrodes 1, 2.

Another way of cutting off the electric current will be described which does not rely on measurement of $\Delta t$. The upper and lower electrodes 1, 2 may be de-energized when a deviation (overall deviation $\Sigma\Delta h$) from the maximum value 18 reaches a predetermined value at the point 16 after the maximum 18 has been detected. Such a way of electrode de-energization can be as effective.

Still another energization control process will be described which differs from the above de-energization processes.

According to the alternative process, the electric current is not cut off at the point 16 upon elapse of the time interval $\Delta t$ or at the point 16 when the displacement has been changed $\Sigma\Delta h$. Instead, the amount of an electric current which is supplied is controlled (e.g., the current is increased to a predetermined degree) to control the joining efficiency.

More specifically, where the electric current is selected to be relatively small, the interval $\Delta t$ of time and the time in which the displacement varies by $\Sigma\Delta h$ is relatively long, resulting in a lowered joining efficiency. To cope with this, the amount of an electric current supplied is increased to reduce the time interval $\Delta t$ or the period in which the displacement varies $\Sigma\Delta h$ for thereby increasing a joining efficiency. Such a change in the electric current supplied can be effected by the welding machine 13, and no detailed description therefor is given here.

Electrical contacts can be joined more advantageously basically by the foregoing control processes than by conventional spot welding and spot brazing processes.

A process of more clearly defining and stabilizing the displacement waveform for the electrodes will now be described with reference to FIGS. 4 and 5.

Where the contact 5 and the base 6 are less planar, the contact 5 and the base 6 are pressed between the upper and lower electrodes 1, 2 to deform the surfaces of the contact 5 and the base 6 so as to render them more planar. As the surfaces of the contact 5 and the base 6 become thus planar, the gap between the upper and lower electrodes 1, 2 is reduced. As a result, an increase in the gap between the upper and lower electrodes 1, 2 due to thermal expansion is not properly reflected in the displacement waveform 17. Therefore, the displacement waveform 17 is less clear, varies and is unstable dependent on the contact 5 to be joined.

In addition, heat tends to be generated by a contact resistance due to rough surfaces of the contact 5 and the base 6. Such unwanted heat is a cause of an unstable displacement waveform 17.

According to the present invention, there is added a preliminary process of pressing the contact 5 and the base 6 and supplying an electric current therethrough to remove suface roughness of and make planar the contact 5 and the base 6, before the upper and lower electrodes 1, 2 are pressed and supplied with an electric current.

More specifically, the upper and lower electrodes 1, 2 are pressed during an interval 300 and supplied with an electric current during an interval 100 from a time 20 to a time 21 in such a preliminary process, so that the surfaces of the contact 5 and the base 6 can be planar as indicated by a displacement waveform 17 during the interval 100. Then, the upper and lower electrodes 1, 2 are pressed during an interval 400 for joining the contact 5 and the base 6, and are supplied with an electric current during an interval 200 in the interval 400. The pressure at this time is lower by a certain amount than the preliminary pressure as shown by a pressure waveform 19.

The waveform 17 during the interval 200 in FIG. 5 corresponds to the displacement waveform as shown in FIG. 3.

In the foregoing embodiments, the upper and lower electrodes 1, 2 are de-energized a predetermined time after the displacement waveform 17 has reached the maximum 18. The scope of the invention also includes a modification in which the amount of an electric current supplied is reduced to the extent that metal (silver, for example) will not be melted out of the joining interface. Although the contact 5 has been shown as including the cladding layer 4 of silver, the cladding material is not limited to silver. The present invention is applicable basically to contacts having no cladding material.

INDUSTRIAL UTILITY

The present invention is applicable to a variety of joining processes utilizing welding (pressure welding, fusion welding), brazing, and the like.

We claim:

1. A process for joining a contact for electric equipment to a base, said process comprising the steps of:
   (a) placing between the contact and the base a layer of a bonding medium which melts to form a bond at a temperature lower than the temperature at which the contact and the base melt;
   (b) placing the contact and the base between upper and lower electrodes;
   (c) pressing the upper and lower electrodes towards each other with a constant pressure;
   (d) supplying an electric current to the upper and lower electrodes at a predetermined constant voltage;
   (e) detecting changes in the spacing between the upper and lower electrodes due first to the increase in thickness of the contact, the layer of a bonding medium, and the base caused by electrical heating and then to the decrease in thickness of the layer of a bonding medium when it melts and part of it flows out from between the base and the contact; and
   (f) turning off the electric current at a predetermined interval of time after the spacing between the upper and lower electrodes has begun to decrease, the predetermined interval of time being calculated to correspond to the interval during which an optimum amount of the layer of a bonding medium has melted and flowed out from between the contact and the base to form a fillet.

2. A process as recited in claim 1 and comprising the further preliminary step of pressing the contact and the base together while supplying an electric current therethrough to remove surface roughness and to make planar the contact between the contact and the base before steps (c) through (f).

3. A process for joining a contact for electric equipment to a base, said process comprising the steps of:
   (a) placing between the contact and the base a layer of a bonding medium which melts to form a bond at a temperature lower than the temperature at which the contact and the base melt;
   (b) placing the contact and the base between upper and lower electrodes;
   (c) pressing the upper and lower electrodes towards each other with a constant pressure;
   (d) supplying an electric current to the upper and lower electrodes at a predetermined constant voltage;
   (e) detecting changes in the spacing between the upper and lower electrodes due first to the increase in thickness of the contact, the layer of a bonding medium, and the base caused by electrical heating and then to the decrease in thickness of the layer of a bonding medium when it melts and part of it flows out from between the base and the contact; and
   (f) turning off the electric current after the spacing between the upper and lower electrodes has reached a maximum and has decreased again by a predetermined amount, the predetermined amount being calculated to correspond to the point at which an optimum amount of the layer of a bonding medium has melted and flowed out from between the contact and the base to form a fillet.

4. A process as recited in claim 3 and comprising the further preliminary step of pressing the contact and the base together while supplying an electric current therethrough to remove surface roughness and to make planar the contact between the contact and the base before steps (c) through (f).

* * * * *

UNITED STATES PATENT AND TRADEMARK OFFICE
CERTIFICATE OF CORRECTION

PATENT NO. : 4,441,006

DATED : April 3, 1984

INVENTOR(S) : Machida Kazumichi et al

It is certified that error appears in the above-identified patent and that said Letters Patent is hereby corrected as shown below:

On the title page add /30/ Foreign Application Priority Data

--[30] Jan. 17, 1981 [JP] Japan ................. 6630 --

Signed and Sealed this

Twenty-sixth Day of June 1984

[SEAL]

Attest:

GERALD J. MOSSINGHOFF

Attesting Officer

Commissioner of Patents and Trademarks